3,110,570
METHOD OF AND APPARATUS FOR CONDITIONING FINELY-DIVIDED SOLIDS
Victor F. Koontz and Donald D. Phelps, Coraopolis, Pa., assignors to Dravo Corporation, Pittsburgh, Pa., a corporation of Pennsylvania
Filed July 1, 1960, Ser. No. 40,399
8 Claims. (Cl. 23—313)

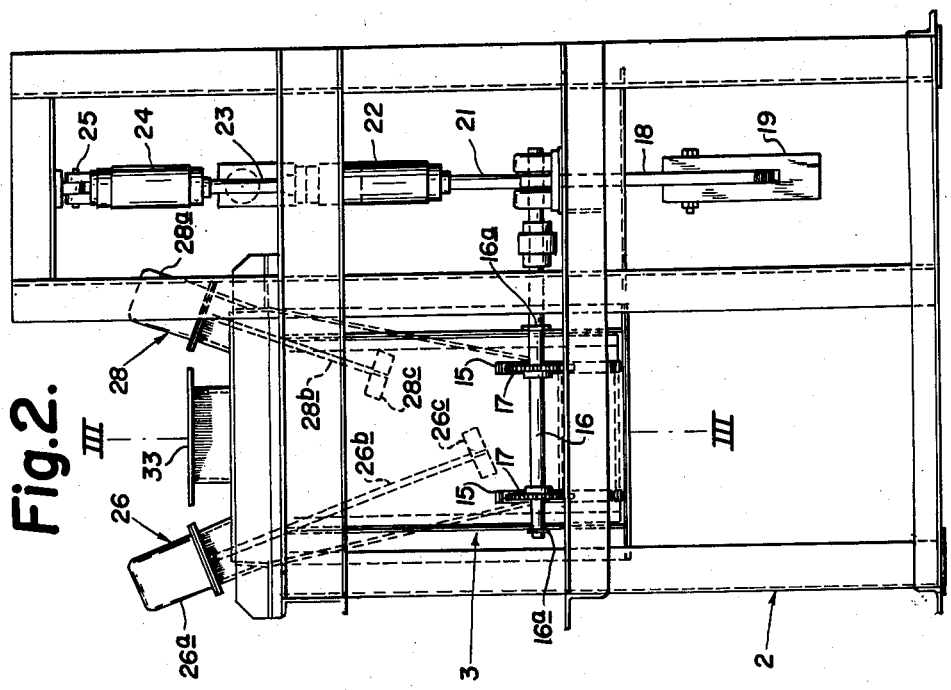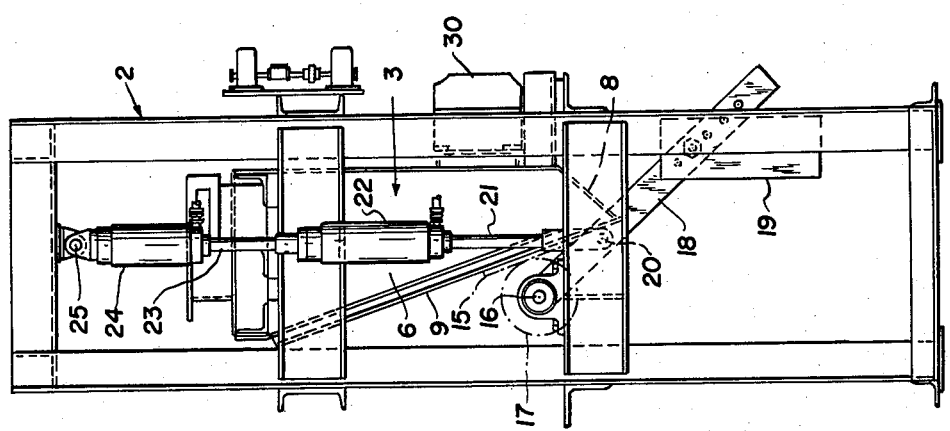
INVENTORS
Victor F. Koontz and
Donald D. Phelps
their ATTORNEYS

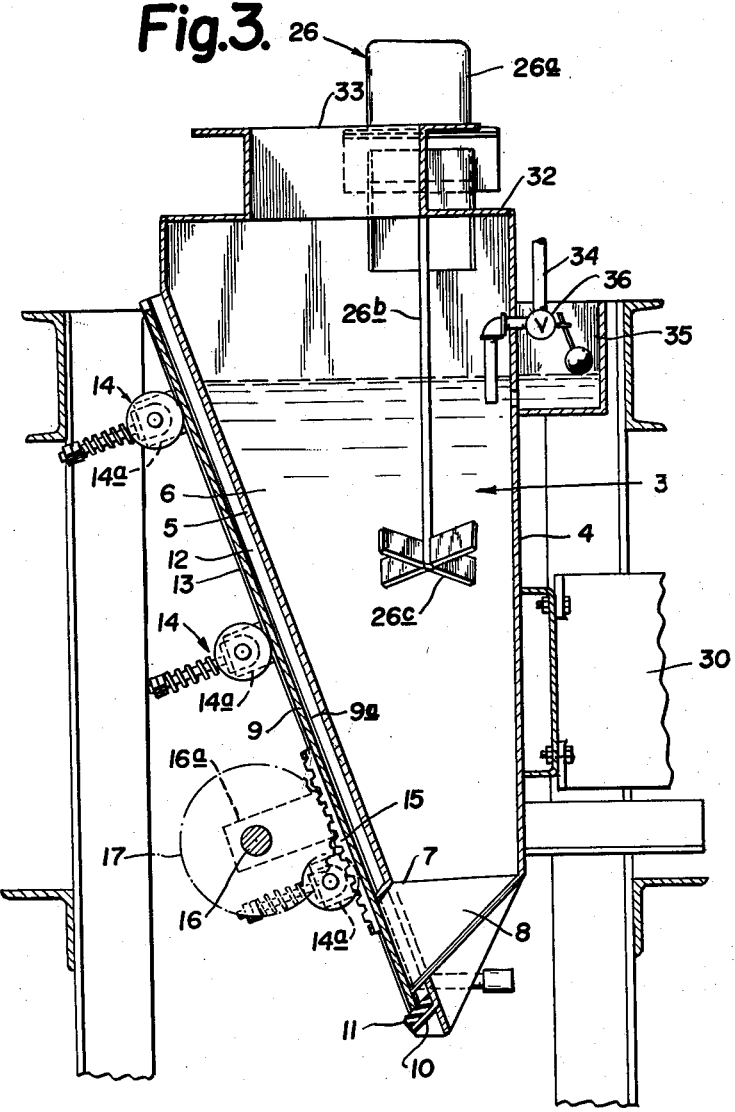
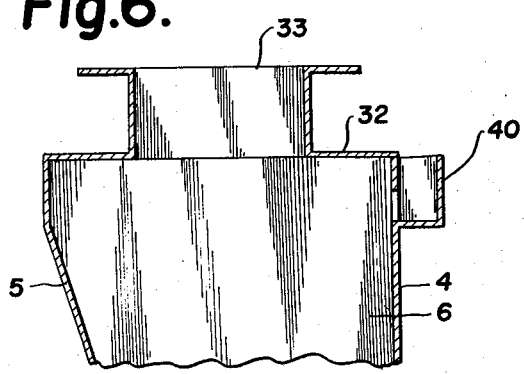

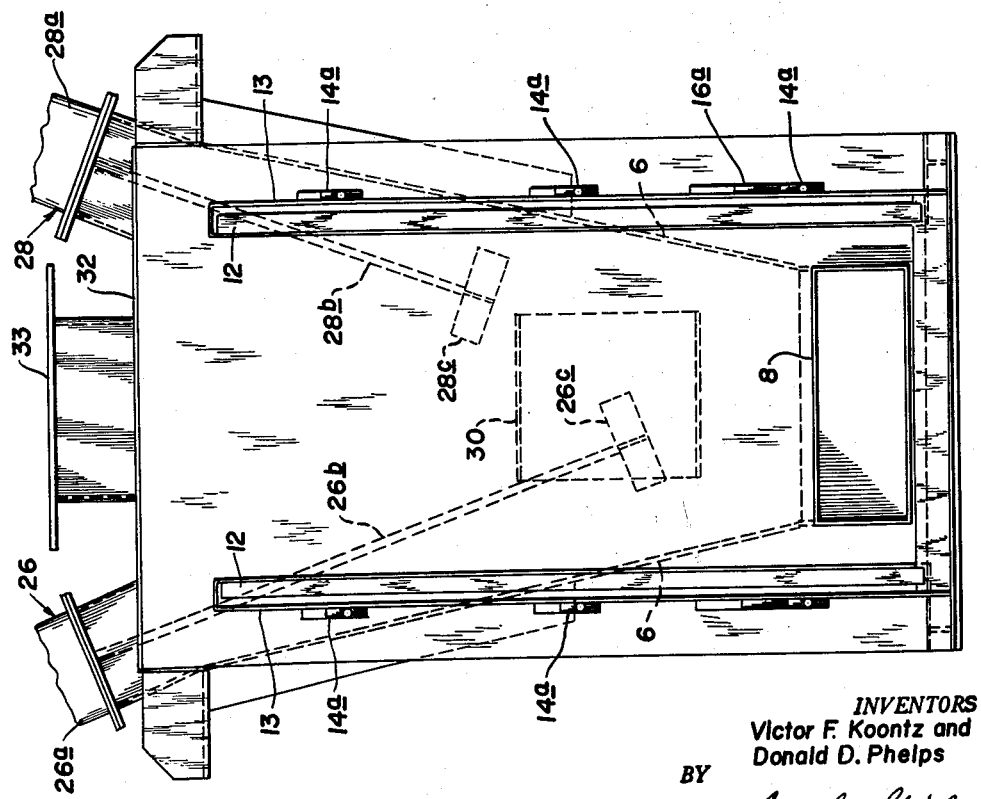

This invention relates to the conditioning of finely-divided solids, and is for a method of and apparatus for agglomerating finely-divided dust-like solids into a moist mass or cake.

The invention has application to the agglomeration of solids from an initially dry condition, or the concentration of solids carried in a liquid vehicle.

In various industries, finely-divided solids of dust-like character are produced either purposely or as an incident to some operation. Typical of some such finely-divided materials are ore dusts, flue dust, fly ash and sinter dust. They are frequently produced from some operation involving exposure to heat, so that they are extremely dry. They may be collected in dust collectors, such as cyclone collectors or electrostatic precipitators, and once collected they are easily blown about by currents of air, so that it is desirable to wet them and agglomerate them into a coherent mass of some kind for transportation or processing. For example, ore dust may be wet with water and the mass then sintered into a product that may be smelted in a blast furnace.

However, because of the small size of the dust particles and their dry character, it is difficult to wet them. A pug mill may be used, but this is relatively expensive and the moisture content of the product is difficult to control.

Sometimes the particles are in a slurry and they must be recovered from a much larger volume of water. In this event, the slurry flows into a thickener where the solids are partially separated from the liquid, and the discharge from the thickener is then filtered, with the solids being recovered as filter cake. Filters are relatively expensive to install and operate, and their use is usually justified only where large volumes of slurry are to be dealt with.

According to the present invention there is provided a relatively simple and compact apparatus capable of continuously receiving the finely-divided solids, wetting them, and discharging them in an agglomerated mass which carries enough moisture to keep the material together, but which is dry enough to be handled in the required manner. Alternatively the apparatus may accept a slurry and discharge the solids continuously in a moist agglomerated state. The apparatus and method are substantially automatic as well as continuous, requiring little attention in the way of manual labor, and little power for the operation. Since the starting material may be either dry or a slurry, and the agglomerated solids are discharged as a moist mass in either case, we refer to the apparatus as a "conditioner."

Our invention has for its principal object therefore to provide a unique method of and apparatus for conditioning finely-divided solids in the manner described, in which the equipment is simple, requires little power or manual labor, which dispenses with filters or reduces needed filter capacity, and which can be installed at relatively low initial cost as compared with present methods.

The invention is presently believed to have particular utility in the preparation of finely-divided particles such as ores for sintering, and for purposes of illustration will be particularly described in connection with the processing of such fines, but without intention of limiting the invention to such material.

In the drawings:

FIG. 1 is a side elevation of an apparatus embodying our invention, and for the practice of our method;

FIG. 2 is a front elevation of the apparatus shown in FIG. 1;

FIG. 3 is a fragmentary vertical section on a larger scale in the plane of line III—III of FIG. 2;

FIG. 4 is a front elevation of the hopper removed from the machine with the gate at the front of the machine removed;

FIG. 5 is a schematic view of the gate operating mechanism; and

FIG. 6 is a fragmentary view of the upper part of the hopper with an overflow weir for use where a slurry instead of dry material is being processed.

Referring to the drawings, there is a structural supporting frame 2 in which is a hopper-like vessel 3 here shown as being of downwardly-diminishing cross-section. The hopper here shown has a vertical rear wall 4, a front wall 5 that converges downwardly toward the rear wall at a steep slope, and downwardly-convergent side walls 6, but it may have vertical walls or be otherwise shaped. The hopper terminates in a discharge throat 7 at its bottom, and below this throat there is a short chute 8 into which the throat opens, and which in effect is a part of the hopper.

There is a gate 9 mounted on the outside of the front wall 5 for movement vertically across the end of the discharge chute. The bottom of the chute has an outwardly-projecting lip 10 on which is a strip of rubber or other sealing material 11 on which the lower end of the gate rests when the gate is fully closed. There are parallel sealing strips 12 (see FIG. 4) extending up the outer surface of the hopper wall 5 from the strip 11, the strips 12 being carried on angle bars 13 attached to the hopper and forming guides for the gate. The gate itself has runner strips 9a confronting the strips 12 for making a sliding seal therewith. The gate is high enough so that its upper edge is above the normal liquid level in the tank when the gate is closed, as hereinafter more fully explained. The gate is yieldably pressed into sealing relation with the strips 12 by spring-biased roll assemblies 14, or like pressure elements (see FIG. 3), having brackets 15 secured to the angles 13 at intervals.

The gate has on its outer face parallel racks 15. At 16 is a shaft carried in bearings 16a. It has pinions 17 that engage the racks 15. At one end of the shaft 16 is a lever 18 which has a counterweight 19 at its end. Attached to the lever at 20 is a rod 21 that constitutes part of a compound fluid pressure cylinder arrangement for moving the lever upwardly from the position shown in the drawings, the cylinders being arranged to rotate the shaft with its pinions 17 in two successive stages. With the first stage, the gate is opened to half uncover the end of the discharge spout 8 and the second opens it the rest of the way. Various ways of operating the gate may be used, but the apparatus here shown to illustrate one arrangement includes a lower cylinder 22 in which is a piston (not shown) for lifting the rod 21. Cylinder 22 is supended from a rod 23 which has a piston (not shown) in cylinder 24. Cylinder 24 is pivotally hung at 25 from the supporting frame structure. When the gate is closed and the lever 18 is in the lowermost position, both piston rods 21 and 23 are in their lowermost or extended positions. If fluid pressure be admitted to the upper cylinder 24, it will lift cylinder 22 and rod 21 to raise the lever 18 through the first stage. Then if fluid pressure be admitted to the lower cylinder 22, rod 21 will be lifted relative to cylinder 22 to move the lever 18 through the second stage to fully open the gate.

A paddle switch of a known type indicated generally as 26 controls the admission of fluid pressure to the cylinder 24 and the draining of said cylinder through an electromagnetic valve 27. This paddle switch includes a motor 26a, connected to power lines L and L′, driving a shaft 26b on which is a paddle 26c at a predetermined level above the bottom of the hopper, but well below the top. As is well known, this type of device may operate a switch to open it when the motor is turning the paddle at a certain speed, but if the paddle offers too much resistance, thereby slowing or stalling its motor, the switch may close to energize the valve 27. There is a second paddle switch 28 having its paddle 28c at a level above the paddle 26c, and it controls an electromagnetic valve 29 for controlling the operation of the lower cylinder 22. When valves 27 and 29 are de-energized, they relieve the pressure in the respective cylinders which they control and the counterweight 19 moves the lever 18 down to effect partial or complete closing of the gate.

There is an electric vibrator schematically indicated at 30 of a known type mounted on the supporting frame back of the rear wall 4. The vibrator element of the vibrator is attached to or effective against the rear wall 4, and this wall acts as a vibrating diaphragm.

The hopper has a cover 32 on which the paddle switches are mounted, and which has a charging opening or connection 33 through which the material to be processed is fed into the hopper. At 34 is a water supply pipe for supplying water to the tank, there being a float chamber 35 at one side of the hopper opening into the hopper with a float valve 36, so that a predetermined liquid level may be maintained in the hopper, but the float, being in a separate chamber, is kept free of the dry material.

The operation of the method and apparatus may now be described. With the discharge gate closed, the hopper is filled with water to the normal depth indicated. Vibrators similar to 30 are used in other operations and they usually vibrate at around 3600 cycles per minute. This is not a critical rate, but is one which we have found to be satisfactory. The vibrator is set into operation and the dust to be processed, such as finely-divided ore, is fed at a predetermined rate into the top of the hopper. The wall 4 of the hopper is thin enough to constitute a vibration-transmitting diaphragm, so that the pulsations generated by vibrator 30 are transmitted to the water with considerable force. This causes the water to wet the dust rapidly and with low expenditure of energy. The wet particles, being heavier than water, sink rapidly to the bottom of the hopper, and the vibration of the sediment produces a compacting action that results in a dense, moist mass being formed in the bottom of the receptacle. The two paddle switches are set into operation, and when the layer of sediment builds up to a depth where it impedes rotation of paddle 26c, this switch energizes valve 27 to operate cylinder 24 to effect a half-way or partial opening of the gate 9. The compacted mass of sediment in the bottom of the hopper is too dense to flow of its own accord and forms a seal against the outflow of water, but the continued vibration of the sediment with the hydrostatic pressure above exerts a force on the sediment comparable to extruding force, causing it to discharge as a moist clay-like agglomerate which is dry enough to handle. If the sediment is removed faster than it accumulates, the paddle 26c of switch 26 will start to rotate at normal speed and cause the gate to close. If the sediment collects faster than it is discharged, it will build up to a level where the operation of the second paddle switch is impeded and the lower cylinder 22 will be energized to fully open the gate and increase the rate of discharge until the level of the sediment drops below the higher paddle when the gate will close to the half-open position. If there should be a current failure which would stop both paddle switches, the gate would close completely under the action of counterweight, thereby providing a fail-safe mechanism. Particles which might otherwise settle slowly in a quiescent state, seem to settle more rapidly under vibration. Seemingly these particles are brought by vibration against one another and cling together forming a larger mass which then settles—at least it appears that the vibration accelerates the descent of the particles. The float valve supplies the necessary make-up water to keep the level in the hopper constant.

The method is applicable to particles which are heavier than water, and which are predominatntly fine enough to form a firm cake, as contrasted to coarser particles like building sand used for cement which will not compact tightly enough to form a coherent mass capable of forming a dam at the bottom of the hopper dense enough to resist the hydrostatic pressure above it. In the process vibration is used first to overcome the hydrophobic or non-wetting property of the fine particles and effect a mixture of water and fines with low energy consumption, and secondly to densify the sediment and to expel the agglomerated sediment from the hopper. The sediment, itself is used as a separating medium between the water above and the material being discharged. Vibration appears also to accelerate precipitation of the finely-divided material possibly as above explained by causing individual particles to come in contact with each other and loosely agglomerate to larger particles which settle faster. The unit may be economically installed where there are small volumes of material to be processed, or at a location where the dust is collected to avoid handling or extensive transportation of dry dust.

In some cases, the fine material may be already entrained in water, as where it is discharged from a scrubber or washer, or some other form of slurry. In this case, the slurry is fed into the hopper instead of the dry fines. Precipitation occurs in the hopper as above described and the fines discharged by vibration from the bottom of an overlying body of sediment. The excess water in this case may be carried off through an overflow weir, as indicated at 40 in FIG. 6, the other parts of the apparatus in this figure corresponding to the construction shown in the other figures, corresponding parts being designated by corresponding reference numerals. A float valve as shown in the other figures may, if desired, be used to control the inflow of slurry. Obviously, should occasion arise, both dry fines and slurry could be processed at the same time. Where large amounts of slurry are to be processed, it is often desirable to first thicken the slurry to reduce the volume of water which must be handled by the conditioner. In this case, the overflow from the conditioner can be returned to the thickener to close the circuit, and the conditioner replaces the conventional filter.

When the operation is first started, water which fills the hopper will also fill the space between the gate and the outer wall of the hopper. This water may be removed before the gate is opened, and after a body of sediment has accumulated by opening drain 41 near the bottom of the gate.

While we have shown and described one specific form of apparatus embodying our invention and for the practice of our method, it will be understood that various changes and modifications may be made in the apparatus within the contemplation of our invention.

We claim:

1. Apparatus of the class described comprising a hopper-like vessel having walls, a discharge throat, a discharge chute below the throat, a gate for selectively controlling the flow of agglomerated solids from the chute, a vibrator carried on the outside of one wall of the hopper, said wall being thin enough to constitute a vibration-transmitting diaphragm to the contents of the hopper, and means responsive to the level of sediment in the bottom of the hopper for operating the gate for maintaining a predetermined minimum depth of sediment in the vessel and opening the gate when the sediment level extends above said minimum.

2. Apparatus for agglomerating finely-divided dry material comprising a hopper having a restricted discharge chute at the lower end thereof, a gate for controlling the passage of material from the chute, power-operated means for opening and closing the gate, means for delivering dry material to be processed into the top of the hopper, means for supplying water to the hopper, means for vibrating the contents of the hopper to accelerate a wetting of the dry material and for compacting sediment in the bottom of the hopper and the discharge chute, and means responsive to the level of sediment in the hopper for controlling the actuation of the power means for opening and closing the gate.

3. Apparatus of the class described for conditioning finely-divided solids comprising a hopper having a downwardly and laterally directed discharge throat at the bottom into which finely-divided material may settle, the throat terminating in a laterally-opening discharge port, means for delivering liquid and solids to the hopper, a vibrator for vibrating the material in the hopper and compacting sediment in the discharge throat at the bottom and for effecting a plastic flow of the sediment, a gate movable rectilinearly across the discharge port, operating means for the gate and means for selectively controlling the movement of the operating means to effect a discharge of sediment through said discharge port and maintain a predetermined level of sediment in the bottom of the hopper.

4. The method of agglomerating finely-divided dry solid material which comprises continuously introducing the material into a vessel containing water, vigorously vibrating the water to effect wetting of the dry material with the water, collecting the wetted material as a sediment in the bottom of the vessel, the sediment being also continuously vibrated to compact the same, withdrawing moist sediment from the bottom of the vessel while maintaining a compacted mass of sediment above that which is being removed to separate the moist material being removed from the liquid above the sediment.

5. The method of agglomerating finely-divided solids as defined in claim 4 wherein the rate of removal of sediment from the bottom of the accumulation is increased as the depth of sediment in the vessel is increased and retarding the removal of sediment as the depth of acculation approaches a level where it will be insufficient to withstand the hydrostatic pressure of the overlying body of water and solid particles.

6. Apparatus for agglomerating finely-divided solid material comprising a vessel of continuously diminishing cross-section downwardly, the vessel having a downwardly and laterally-directed discharge opening at the bottom and a bottom plate sloped toward said opening, a slidable gate movable in a plane across said opening for controlling the passage of material therethrough, means for introducing finely-divided solid material and water into the top of said vessel, means providing an outlet for water near the top of the vessel, a vibrator attached to one wall of the vessel for vibrating it and causing the compaction of finely-divided solid material over the sloping bottom of the vessel and stimulating the movement of such compacted solid material through the opening, and mechanism for effecting movement of the gate across the opening.

7. Apparatus for agglomerating finely-divided solid material as defined in claim 6 wherein said last-named mechanism includes servo-motor means for operating the gate, and vertically separated paddle switches in the vessel to effect a closing of the gate as the level of material falls and an opening of the gate when the accumulated material reaches a predetermined level.

8. The method of effecting agglomeration of finely-divided solids in water which comprises continuously introducing the solids and water into a vessel of downwardly-diminishing section and vibrating the vessel to accelerate sedimentation of the solids and compaction thereof while maintaining the liquid mixture above the compacted material, decanting water from the top of the vessel and utilizing said vibration to effect a downward and lateral discharge of the compacted material at the bottom, and controlling the rate of discharge to always maintain a predetermined minimum level of compacted solids between the discharge and the liquid mixture.

References Cited in the file of this patent
UNITED STATES PATENTS

| | | |
|---|---|---|
| 1,665,081 | Andrews | Apr. 3, 1928 |
| 1,923,678 | Lowell | Aug. 22, 1933 |
| 1,986,897 | Shaw | Jan. 8, 1935 |
| 2,336,378 | Uhlig | Dec. 7, 1943 |